May 29, 1923.  
E. W. LITTLE  
1,456,889  
AUXILIARY SPRING FOR MOTOR VEHICLES  
Filed Nov. 6, 1920
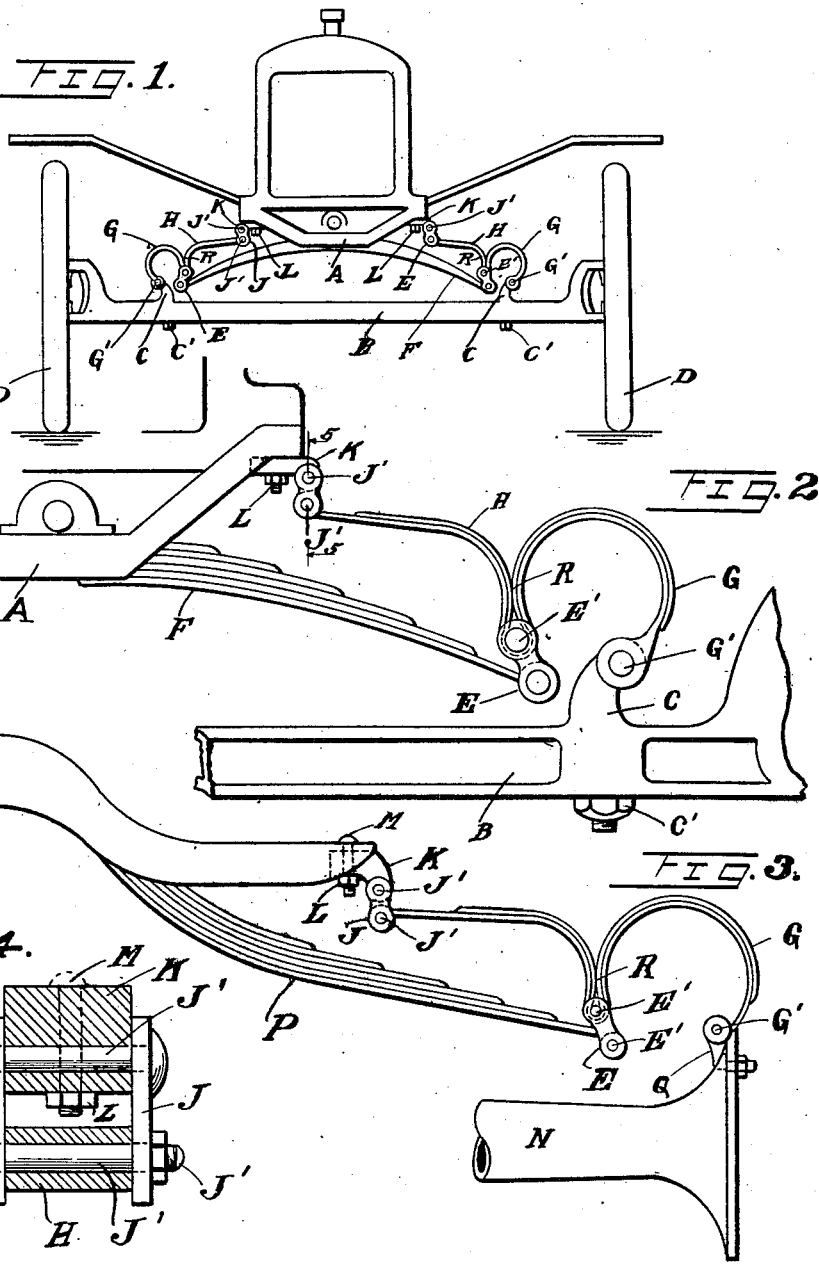
Inventor  
E. W. Little Patented May 29, 1923.

1,456,889

UNITED STATES PATENT OFFICE.

EARL W. LITTLE, OF INDIANAPOLIS, INDIANA, ASSIGNOR TO EDWARD W. LITTLE.

AUXILIARY SPRING FOR MOTOR VEHICLES.

Application filed November 6, 1920. Serial No. 422,360.

*To all whom it may concern:*

Be it known that I, EARL W. LITTLE, a citizen of the United States, residing at Indianapolis, in the county of Marion and State of Indiana, have invented new and useful Improvements in Auxiliary Springs for Motor Vehicles, of which the following is a specification, reference being had to the accompanying drawings, forming a part thereof.

The purpose of this invention is to provide means which shall be readily applicable to an existing spring suspension of a motor vehicle and adapted to improve the action of such spring suspension so as to increase the ease of riding while decreasing the tendency to rebound, such as exists in the original spring system. It consists of the features and elements and their combinations shown in the drawings and hereinafter described as indicated by the claims.

In the drawings:

Figure 1 is a front elevation of a motor vehicle equipped with the devices embodying this invention.

Figure 2 is a detail view on a larger scale showing certain parts from the same point of view as in Fig. 1.

Fig. 3 is a detail view on the scale of Fig. 2 showing in elevation the corresponding parts for the rear axle spring.

Fig. 4 is a detail section taken at line 5—5 on Fig. 2.

The devices embodying this invention are shown in the drawings as applied to a motor vehicle in which the spring suspension consists simply of a comparatively long semi-elliptic leaf spring interposed between the frame, A, and each of the axles, such spring extending over and in the same vertical plane as the axle which it connects to the frame. It will be understood, however, that the invention is not limited in its application to this type of spring suspension, as will appear upon further description.

Referring first to Fig. 1 and the enlarged detail view of Fig. 2, it may be noted that the front axle, B, has bolted to it a bracket or perch, C, shown with its upper end bent laterally outward from the vehicle body, extending obliquely upward and toward the road wheel, D, at the same side of the vehicle. In its original arrangement this bracket, C, is mounted to extend obliquely inward and toward the body of the vehicle so that it may support the upper end of a link, E, whose lower end pivotally engages the end of the transverse spring, F. For the purposes of the present invention the bracket, C, is rendered adjustable by loosening its securing nut, C¹, and is turned around 180°, or if preferred the two perches, C, may be interchanged so that the right hand perch is mounted at the left hand end of the axle, B, and vice versa. The spring, G, formed for pivotal connection at G¹, to the end of the bracket, C, and for pivotal connection at E¹, to the upper end of the link, E, and the remote end of the auxiliary spring, H, is pivotally connected at J¹, to the lower ends of a pair of links, J, whose upper ends are pivotally supported by the frame, A. The mounting for the links J J is provided with a support securely bolted by, L, to the frame, A.

At the rear axle, N, which is shown in Fig. 3, the rear spring, P, is provided with an outfit similar to that furnished for the front spring, F, and modified only in dimensions, except that a new bracket or perch, Q, must be furnished because the original perch does not happen to be available by reversal as in the case of the front axle perches, C. The remaining parts being similar to those shown in Fig. 2, except as to detail dimensions, are provided with corresponding reference letters.

Thus it will be seen that the thin ends of the spring, F, and, P, instead of supporting the vehicle directed upon their respective axle are hung upon yielding supports at E¹, so that any bump or jolt tending to flex the outer end of either of the main springs, F, and P, must cause a greater movement of the axle to produce a given movement of the frame, A, out of its normal plane. That is, the more yielding connection between the axle and the frame due to the presence of the auxiliary springs, will serve to absorb more vibration of the wheels than could be absorbed by the springs, F and P, alone.

Another action of the auxiliary spring suspension embodying this invention is its tendency to minimize side sway of the vehicle body with respect to the running gear. It may be noted that the body is suspended from the running gear primarily by the links, E, E, which are both oblique to the perpendicular and in opposite directions with respect thereto, so that when the body tends so swing transversely one end of the transverse spring, F or P, will travel upward about an arc of which the link, E, is a radius, while the other end of the same spring must travel upward about an arc of which the other link, E, forms the radius. As the downward movement of the main spring after its downward movement, moves each of the links, E, to a horizontal any further movement thereof is absorbed and shocked by stress upon the eyelets and downward curves of, H and G.

The body's upward movement being much greater than at the axis $E^1$, is therefore checked and absorbed by the thin ends of H, and the pressure at, R, between the adjacent sides of, G, and H, causing the entire auxiliary spring to resist such upward motion together with the force of gravity.

In the construction illustrated it will be noted that each of the transverse springs F and P, is so rigidly fixed to the frame, A, at the middle of the frame that the opposite ends of these springs will act almost independently of each other as simple cantalivers. Each of the springs, P, and F, are simple cantaliver, but these auxiliary springs will be just as efficiently applicable to a spring suspension employing two semi-elliptic springs such as are commonly mounted to extend longitudinally of the vehicle frame, with their thin ends connected to the frame and with the vehicle axle mounted on the springs intermediate of the ends. I do not limit myself, therefore, to the combination of my auxiliary springs with the exact forms of vehicle springs illustrated in the drawings.

I claim:—

1. A shock absorbing device comprising a vehicle spring, two auxiliary leaf springs, one comprising an inverted U pivotally connected at one end to an axle element, the opposite end of said U, pivotally connected to one end of the main spring; the other auxiliary spring forming an arc and supported at one end by a vehicle element and the opposite end of said arc pivotally connected to the said end of the main spring, said auxiliary leaf springs forming a yielding contact with each other at a point intermediate their ends and yieldingly supporting the end of said main spring.

2. A shock absorbing device comprising a vehicle leaf spring, an auxiliary leaf spring having one end pivotally supported by an axle element, and its opposite end supported by a vehicle element, the auxiliary spring having a pendent loop at an intermediate point of its length, and the end of the main spring supported from the auxiliary spring by a link connected to the pendent loop of the auxiliary spring.

3. A shock absorbing device comprising a vehicle spring a yieldable member at one end of the vehicle spring in the form of an inverted, U. said, yieldable member, having one side thereof supported by a vehicle element, the opposite side of said yieldable member connected to and forming a part of and one side of a pendent loop, and an arc shaped spring connected to the opposite end of such loop and the end of said arc-shaped spring remote from the pendent loop being connected to a body element, said arc-shaped spring being adjacent to or against the side of said yieldable member and means connecting said pendent loop to one end of said main spring.

4. As a new article of manufacture, a vehicle spring having a pendent loop at an intermediate point of its length, an inverted U-shape loop at one side of said pendent loop and merged into the same, and a curvilinear portion at the opposite side of the loop and also merged into the same.

EARL W. LITTLE.